UNITED STATES PATENT OFFICE.

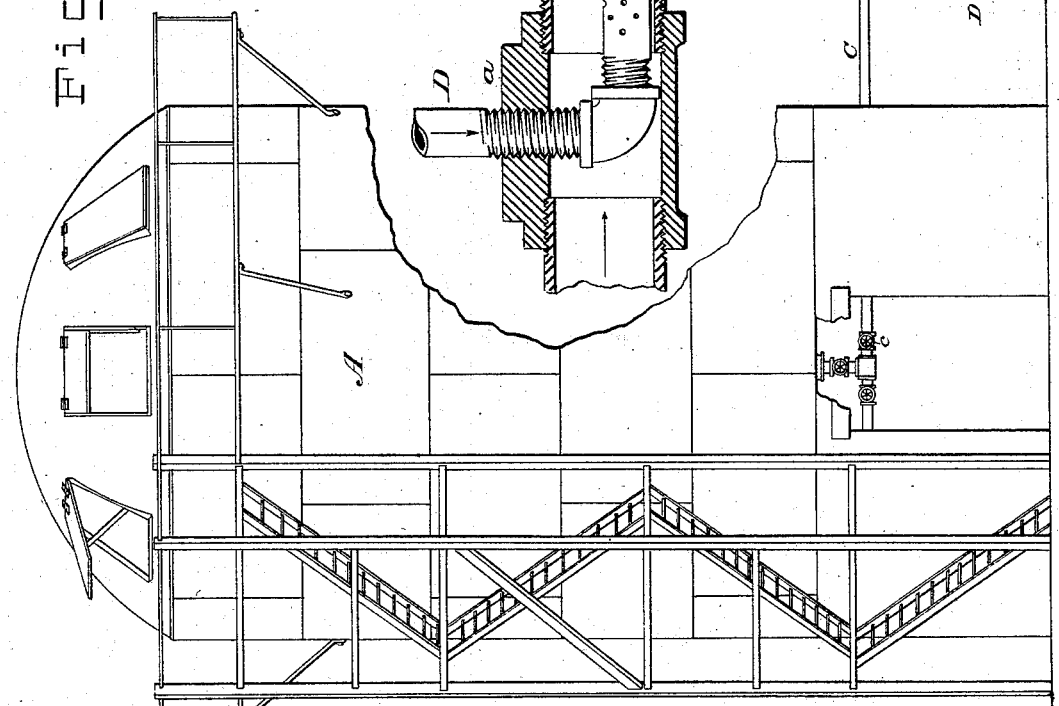

ABRAM M. McCREARY, OF BROOKLYN, NEW YORK.

APPARATUS FOR STEAMING PETROLEUM-OILS.

SPECIFICATION forming part of Letters Patent No. 283,005, dated August 14, 1883.

Application filed March 17, 1883. (No model.)

*To all whom it may concern:*

Be it known that I, ABRAM M. MCCREARY, a citizen of the United States, and a resident of Brooklyn, Kings county, New York, have invented certain Improvements in Apparatus for Steaming Petroleum-Oils, of which the following is a specification.

In treating petroleum-oils for the removal of the lighter and more volatile hydrocarbons, whereby said oils are to some extent deodorized and the fire-test raised, the oil is usually placed in large tanks lined with lead and submitted to the action first of acid and then of alkali to remove the traces of the acid remaining after the first purification. The alkali and other impurities are then washed out with water, which is drawn off at the bottom of the tank, and steam is admitted to the oil in the tank and the whole mass thoroughly heated in order to expel the lighter gaseous products. Where this steaming is carried on in lead-lined tanks the lead expands with the heat, but in cooling it does not (as with the harder metals) contract to its original size, and the result is that these linings have to be often replaced, owing to the injury resulting from repeated expansions. In some cases to avoid this the oil is first drawn off into the iron storing or settling tank before the steaming; but in any case several hours are lost in the steaming operation, and the steaming in mass is disadvantageous in many respects.

In my present invention I seek to overcome entirely the loss of time required to steam the oil by the old method, to economize the steam employed, and to effect a more thorough steaming than is usually obtained by steaming directly in the tanks. To accomplish this I steam the oil on its passage from the refining-tank to the storing or settling tank. This I do by arranging in the oil pipe or conduit a perforated steam-pipe over which the oil must flow in its passage. This device I will now describe with reference to the accompanying drawings, wherein—

Figure 1 is a general view of the apparatus for purifying and steaming; and Fig. 2 is a sectional view on a larger scale, illustrating the novel features of the apparatus.

Referring to Fig. 1, A is the large purifying-tank, which is of the usual construction. B is the receiving or settling tank, and C is the pipe which leads the oil from A to B.

Referring now to both figures of the drawings, but particularly to Fig. 2, D is the steam-pipe, which enters the oil-pipe C at $a$ and connects with an inner steam-pipe, D', which is perforated with small holes and extends along the inside of the oil-pipe, preferably about fifteen feet. The length of the pipe D' will however vary somewhat with circumstances, and according to the judgment of the operator.

The operation is as follows: When the oil has been treated in the usual way in tank A, steam is let on through pipes D and D' and the oil started through pipe C by opening cock $c$. As the oil flows through pipe C it is compelled to flow over and envelop the perforated steam-pipe D', and the numerous jets of steam from this pipe come into forcible contact with every particle of the oil as it flows into tank B, and said oil is thus thoroughly heated and steamed. Thus it will be seen that my apparatus enables me to steam the oil while it is flowing from one tank to the other; and as this shifting of the oil from tank to tank must take place in any case I save the time ordinarily required for steaming, which is usually about two to four hours; but this is not all the saving effected by my apparatus. In the ordinary mode of steaming, where the steam is admitted into a large open tank of oil, the maximum of economy in the use of steam is not attainable, while with my apparatus, where the steam is brought into direct contact with every particle of oil in the narrow confined space of the oil-pipe, no steam is or need be wasted. The amount of steam admitted to the oil-pipe may be regulated by a cock, $d$.

I do not wish it understood that I claim as new the injection of steam into petroleum-oils for heating them. This, as I have before stated, is in common use. Nor do I claim as new the introduction of a perforated steam-pipe inserted into a still for distilling crude petroleum. Such stills are composed of a circulatory pipe, with a perforated steam-pipe arranged inside of it, and outlet-pipes arranged at intervals over the steam-pipe inside to carry off the lighter products eliminated by the heat. My device is intended solely for the purpose of heating the refined and purified oil while it is flowing from the purifying-tank to the receiving-tank, in order to economize the time usually required for heating it in the tank. The pipe which connects the two tanks is hermetically closed and has no outlet for the lighter vapors except into the tank B. These rise from the receiving-tank after the oil flows into the latter, and pass off through openings in its cover.

Having thus described my invention, I claim—

The combination, with the purifying-tank A and the receiving-tank B, of the tight or hermetically-closed pipe C, arranged to connect said tanks and to lead the oil from A to B, the steam-supply pipe D, and the perforated steam-pipe D', arranged inside of pipe C, for the purpose of heating the oil as it flows through C from A to B, as set forth.

In witness whereof I have hereunto signed my name in the presence of two subscribing witnesses.

ABRAM M. McCREARY.

Witnesses:
 HENRY CONNETT,
 ARTHUR C. FRASER.